United States Patent Office 3,365,315
Patented Jan. 23, 1968

3,365,315
GLASS BUBBLES PREPARED BY REHEATING SOLID GLASS PARTICLES
Warren R. Beck, St. Paul, and Donald L. O'Brien, South St. Paul, Minn., assignors to Minnesota Mining and Manufacturing Company, St. Paul, Minn., a corporation of Delaware
No Drawing. Filed Aug. 23, 1963, Ser. No. 304,221
3 Claims. (Cl. 106—40)

This invention relates to minute glass bubbles formed by a process involving direct conversion of glass cullet particles into the glass bubbles by heating.

We have found it possible to form discrete free-flowing masses of glass bubbles by "blowing" or expanding particles having the amorphous character known as glass, even though such would not be expected to be possible. Ordinarily, one would expect that pre-formed amorphous glass particles could not possibly be converted directly into a hollow condition. Efforts of others working to gain glass bubbles have been directed to the preparation of an unfused raw batch mixture in which a blowing agent is incorporated, followed by heating the mixture to gain simultaneous glass formation at the time of triggering the blowing agent to cause expansion. Some appear to have relied upon non-glass raw materials of nature to contain the necessary balance of ingredients for glass formation as well as the necessary ingredients for the creation of gas during glass formation in their efforts to form glass bubbles. In short, it appears that workers in this art have considered it impossible to form hollow microspheres or bubbles of glass from raw material particles which themselves are already in the glass state. The temperatures required for glass formation are known to be in excess of those at which a blowing agent or the like for bubble formation is activated; thus, one logically would avoid prior glass formation if a glass bubble is to be made.

We, however, have found that pre-formed amorphous glass particles, even synthetic man-made glass particles, may be converted into glass bubbles or microballoons. Significant in this respect is that we have learned that glass particles either may be modified sufficiently (after in the glass state) to contain the necessary ingredients for expansion or "blowing" during heating, or may be, if desired, so manufactured as to contain latent heat-activable expansion means.

A tremendously significant advantage is gained by forming glass bubbles directly from pre-formed amorphous glass particles. The strength of the walls of the bubbles so formed is significantly greater than that exhibited by glass bubbles of comparable size and wall thicknesses manufactured by the process of simultaneous fusion of raw material into glass at the time of expansion (see Veatch et al. U.S. Patent No. 3,030,215). Part of the reason we obtain improved strengths may be because we are able, in our process of manufacture, to use stronger glass compositions and a wide variety of glass compositions, whereas the composition of the raw mixtures useful in conducting the fusion-blowing process as described in Veatch et al. U.S. Patent No. 3,030,215 is severely limited. Nevertheless, even when glass of inorganic content comparable or identical to that of the glass in glass bubbles formed by the fusion-blowing process is converted into bubbles by our process, the resulting bubbles are superior in strength as compared to those of essentially the same size distribution and wall thicknesses but formed by simultaneous fusion and blowing.

The unexpected nature of our invention also becomes apparent from an examination of "reboil" phenomenon in glass technology. During re-melt of some glasses, gaseous material has been observed to form. Characteristically, however, gaseous matter escapes from the reboiled glass during reheating. Cooling of the re-melted glass results in the entrapment of only a minor or relatively small portion of the gaseous matter as voids. Some of the gaseous matter may even be reabsorbed. Thus, one would expect, based on prior art reboil phenomenon itself, that generated gaseous material would escape from glass during reheating, particularly from re-heated small particles of glass, with the result that glass balloon formation would not come about.

Our glass bubbles or hollow microspheres of improved strength are particularly useful as ingredients in molded parts designed for use in high pressure environments (e.g., structural components of submarine or experimental underwater apparatus designed for ocean depths). Advantageously, however, our particles may also be designed (e.g., very thin walls) so as to be useful in applications where the crushing strength desired is relatively low or confined within critical limits, as in indicating, measuring or testing apparatus. Illustratively, our particles may be used in oil or resin masses and so designed as to collapse under certain isostatic pressure conditions under which further operability of a piece of equipment may not be desired. Additionally, our high strength bubbles can be used as a filler in solid materials such as resins to provide insulative rigid foams of very low density but high strength, as needed for aircraft and missiles. They may also be used as a filler for adhesives for aircraft where every pound saved adds to the payload which can be carried.

Glass bubbles of the invention are generally unicellular; but the product may contain some bubbles having a plurality of internal voids separated by extremely thin veils of glass. Product taken directly from the heating step of manufacture may be classified by screening and flotation techniques into limited size ranges and composite or average true particle density, as hereinafter defined. Further, the wall thicknesses of a mass of the bubbles may be reduced drastically, even after the heating step of bubble formation, by etching material from the outer surface of the spheroidal particles, or by vacuum expansion at plastic glass temperatures. Thus, very light weight hollow microspheres having relatively high crushing strength relative to the weight thereof are possible. Of course, such light-weight bubbles may relatively easily be crushed under impact pressure, but they are surprisingly strong as compared to bubbles of like size, weight and volume (that is, like diameter and wall thickness) but formed by simultaneous fusion and blowing.

We will now proceed to describe our invention in detail. It is felt that a drawing is unnecessary for full comprehension of the invention, since the minute spherical glass balloons or bubbles of the invention are readily visualized without the aid of a pictorial representation. They may vary in diameter from a few microns (e.g., 5 microns or possibly 10 microns) up to approximately 100 microns, or 150 microns or even 300 microns. Generally, however, the diameter will not be greater than approximately 200 microns.

The exterior glass wall thickness for our glass balloons also varies, usually from a fraction of a micron up to approximately 10% of the diameter of a complete glass bubble. However, bubbles of the invention having exterior glass wall thicknesses as high as 20% of their diameter may sometimes be useful in applications where extremely high strength with some sacrifice in lightness of weight is possible. Exterior wall thicknesses from a fraction of a micron (e.g., 0.5 micron) up to approximately 5 or 7% of bubble diameter are most frequently preferred for applications taking advantage of high resistance to isostatic crushing in combination with low weight and density as compared to other known glass bubbles.

While the isostatic crushing resistance characteristics for our bubbles generally decreases as wall thickness of the bubble decreases, our bubbles show a greater resistance under isostatic pressure conditions than glass bubbles of essentially identical average true particle density, diameter, and even inorganic content but formed by simultaneous blowing with glass formation.

By isostatic crushing resistance for bubbles we mean the resistance of glass bubbles to crushing under isostatic pressure conditions created by applying pressure upon a fluid such as water or oil (preferably mineral oil) in which the bubbles are immersed. The resistance is expressed in weight percent of the glass bubbles crushed. Thus, the lower the percent reading, the greater the resistance to isostatic crushing.

Average true particle density is obtained as follows: A sample of bubbles is placed in a chamber which is filled with air under compression. The air volume in that chamber is compared with the air volume in an identical sized chamber in which air is under equal compression (i.e., an air comparison Pycnometer). The difference in air volume is recorded; and the true volume occupied by the bubbles is calculated. The average true particle density is obtained by dividing the true volume occupied by the bubble sample into the weight of the sample. The resulting value is an average of the sum of the density of the glass walls per se of the bubbles and the void gas-containing area enclosed within each glass wall. Also, the resulting value is an average true particle density because the particles of any sample will usually not be of exactly the same size. Of course, determining average true particle density as noted gives useful values only when the glass walls of the bubbles are substantially free of pores communicating to the interior thereof. Bubbles of this invention are substantially free of such pores, although pores through the walls of our bubbles may be introduced, e.g., subsequent to bubble formation, if desired. The average true particle density for bubbles of the invention may vary from about 0.05 to 1.2, usually 0.2 to 0.6, grams per cc.

Using the diameter of bubbles and the average density of the composition of the glass itself in bubbles, one is able to calculate with reasonable accuracy the average wall thickness of glass in bubbles under study. Generally the estimates of wall thicknesses obtained by this calculation are accurate enough for most practical determinations where wall thicknesses enter in; but it is also possible to measure the glass wall thicknesses by using a microscope if such exact detail is important for any particular use to which the glass balloons are to be put.

The composition for the glass of our balloons may vary widely. For most convenient practice of our invention, however, we have found that the most suitable glass particles to use have a compositional analysis of ingredients including at least some $SiO_2$, preferably at least about 40 weight percent $SiO_2$, with at least about 5 weight percent of a fluxing ingredient such as an alkali metal oxide, and at least 5 weight percent up to approximately 50 weight percent of one or more bivalent, trivalent, quadrivalent (other than silicon), or pentavalent oxides selected so as to provide a total glass composition which melts to form glass at a temperature between approximately 1200° C. and 1500° C., preferably between 1300° C. and 1450° C. In most instances, we have found that glasses having a compositional analysis including at least 2% by weight of an alkaline earth oxide are preferred. Also, glasses having relatively low alkali metal oxide content in relation to $SiO_2$ content are preferred. Specifically, preferred glasses have a weight percent of $SiO_2$ more than 5 times that of the weight percent of alkali metal oxide (e.g., a mol ratio of $Na_2O$ to $SiO_2$ above about 5.2). Glass bubbles of the invention having such formula generally have the higher bond strengths for constituents of the glass.

Characteristically, the melt of a mixture of raw ingredients most desirably used to form glass particles for use in the invention exhibits a viscosity (in the glass-forming furnace) on the order of 10 poises, or an even higher viscosity, but usually a viscosity heavier than one poise. While raw mixtures which exhibit the lower viscosities in the glassforming furnace may be used to form the starting glass particles, greater yields of useful bubble product are gained when the starting glass particles are formed from raw batches which exhibit the higher viscosities aforenoted.

During melt of the glass particles themselves for bubble formation, the temperature employed is sufficient to render the glass plastic but preferably not fluid enough to be poured except as an extremely viscous liquid. Usually the temperature employed for bubble formation (e.g., 1050° C.–1300° C.) are between 100° C. and 300° C. lower than the temperature required for initial glass formation.

Suitable glass compositions of conventional water-insoluble character for practicing the invention are well known and as such form no part of the invention. Conventional commercial soda-lime-silica glass has been used very successfully to form bubbles of the invention. Preferred glass particles for use in practicing the invention have a compositional analysis within the approximate ranges set forth in the following table.

*Table I*

| Ingredient: | Weight, percent |
|---|---|
| $SiO_2$ | 60–80 |
| $Na_2O$ | 5–16 |
| $CaO$ | 5–25 |
| $K_2O+Li_2O$ | 0–10 |
| $Na_2O+K_2O+Li_2O$ | 5–16 |
| RO (other than CaO) | 0–15 |
| $RO_2$ | 0–10 |
| $R_2O_3$ | 0–20 |
| $R_2O_5$ | 0–25 |
| Fluorine | 0–5 |

Alkaline earth oxides such as BaO, MgO and SrO, as well as such bivalent oxides as ZnO and PbO, satisfy RO in the table. $RO_2$ includes such ingredients as $TiO_2$, $MnO_2$, and $ZrO_2$. $R_2O_3$ is satisfied preferably by $B_2O_3$, but is also satisfied by $Al_2O_3$, $Fe_2O_3$, or $Sb_2O_3$. $R_2O_5$ includes such ingredients as $P_2O_5$ and $V_2O_5$.

As aforenoted, the glass balloons of this invention are formed by converting amorphous glass particles as such directly into a balloon state by a process involving heating the glass particles to a temperature high enough to cause the glass of the particles to become plastic and incidentally also high enough to effectively cause the formation of some gaseous material within the glass particle and expansion of the particle commensurate with the amount of gaseous material formed therewithin under the conditions of heating. In no instance have we found it necessary, for gas formation, to employ a re-melt temperature greatly in excess of that temperature at which the glass undergoing treatment becomes sufficiently fluid or plastic enough to spherulize when maintained in a suspended state either by gas currents underneath the same or by allowing the particle to freely fall through a heating zone. Generally the lowest temperature for bubble formation is the temperature causing glass to assume a viscosity less than about $10^4$ poises; and the highest temperature for bubble formation will not exceed the temperature at which the glass thins to a viscosity on the order of 10 poises, preferably no less than 50 poises. The temperature to use for bubble formation may readily be determined for any glass by determining the temperature at which the glass assumes a viscosity on the order of about $10^3$ poises, using conventional viscosity measuring apparatus as known in the glass art (e.g., a rotating platinum cylinder in the glass melt, the cylinder being connected to indicating apparatus such as that of a Brookfield viscometer). It is quite desirable to avoid overheating in the re-melting step since excessive overheating may tend to cause the escape or reabsorption of gases from the particle undergoing treatment and thereby defeat the attainment of bubble formation. Distortion of the spherulate character of the final particle also may occur on excessive heating although some distortion is not particularly objectionable for many applications.

The temperature for bubble formation is maintained, during bubble formation itself, for only a fraction of a second or so up to approximately 2 or 3 seconds. The time is conveniently controlled by dropping the glass particles through a heating stack in a free falling manner. The temperature of the heating stack, of course, may be maintained slightly in excess of the bubble formation temperature desired; but the glass particles themselves, as they fall through the high temperature, only reach the temperature necessary for bubble formation since they are in and out of the high temperature zone within a fraction of a second and heat transfer or pick up by them is extremely rapid since they are so small, usually no larger than 270 mesh (and at least no larger than about 150 mesh U.S. standard).

Prior to the reheating step, the glass particles are either subjected to a treatment causing a quantity of a material which will become gaseous during that step to be incorporated therein or are known from preliminary reheating tests in a heating stack to contain a sufficient quantity of such material to effectively form bubbles. We have found that gas forming material may be incorporated within glass particles by the simple step of allowing the particles, either at room or higher temperatures below melting, to adsorb or absorb such materials as the following from an atmosphere surrounding the particles: $H_2O$ or $CO_2$ or $SO_2$ or $F_2$, etc.

Alternatively, we may incorporate directly into the glass of the particles to be subjected to treatment a quantity of an inorganic material or complex designed to break down and liberate gases during the reheating step. Illustrative complexes which are sufficiently unstable at the temperature of melting for conventional glasses to break down to liberate gas and cause bubble formation even during the reheating step are those of fluorides, such as sodium fluoride and calcium fluoride.

Whatever the explanation, the startling fact is that we have found it possible to form individual glass bubbles from pre-formed amorphous glass particles, whether occurring in nature or synthetically made.

For optimum success of our technique in forming glass bubbles, we have found that the glass particles to be used in bubble formation are most desirably formed by fusing raw materials into the amorphous glassy state in an oxidizing atmosphere. For some reason, an oxidizing atmosphere for formation of the initial glass to be later used in bubble formation imparts, or does not prevent the attainment of, a glass structure for the particles such that the particles either retain a gas-generating property or readily absorb or adsorb the gas-generating ingredients therewithin. Conversely, while not essential, we have found it preferably for maximum glass bubble yield to reheat the particles under either neutral conditions or under reducing conditions such as created by passing the particles through a reducing flame where the ratio of combustible gas to oxygen is higher than stoichiometric. Reheating under reducing conditions as described is readily accomplished with accompanying bubble formation without impairment of the quality of the glass in the bubbles since the time to which the glass is subjected to reducing conditions is so very short and the temperature to which the glass is subjected is substantially only that necessary for plasticization of the same as distinguished from the higher temperature required for initial glass formation. Thus oxygen from the composition of the glass itself is not significantly removed during reheating under reducing conditions. If any minute carbon deposits on the glass bubbles are formed by this procedure, they may readily be removed by washing.

Bubbles from the reheating step are collected by a water spray and then may be subjected to special treatments or processing as desired for any particular application. For example, a stearate-chrome complex (e.g. "Volan") may be applied to the bubbles. Acid treatments (e.g., 5% HF solution) may be used to reduce the wall thickness of the glass bubbles. Acid etching tends not only to reduce the glass wall thicknesses for our bubbles, but also it reduces their strength. However, the resulting bubbles still remain stronger than otherwise comparable bubbles formed according to the fusion-blowing process. We believe the reason for the improved strength of our bubbles is due largely to the fact that the glass of the bubbles is essentially homogeneous with the ingredients of it tightly bonded therein, as distinguished from the type of "glass" one obtains during the brief period of glass formation characteristic of the simultaneous fusion-blowing process. This distinction appears supported by the fact that sodium or alkali content in the glass of our bubbles is not easily leached therefrom, whereas it is readily removed from the glass of bubbles formed by simultaneous fusion-blowing.

This invention will further be illustrated by a series of specific illustrative examples.

*Example 1*

Very practical and economical glass bubbles may be formed as follows: The starting glass was in the spherical bead state (although rough particles of glass cullet may be used). Its composition, in weight percent, consisted of 72.2% $SiO_2$, 1.2% $Al_2O_3$, 8.8% $CaO$, 3.3% $MgO$, 14.2% $Na_2O$, 0.2% $K_2O$, and 0.1% $Fe_2O_3$. The beads were of a size such that 90% by weight fell within 20 to 40 microns diameter. Approximately 5% by weight were smaller than 20 microns in diameter and an approximately equal weight percent were larger than 40 microns diameter up to about 80 microns in diameter. Also, about 50 weight percent of the beads were 28 microns in diameter or larger. These beads were subjected to an air atmosphere of 100% relative humidity at 550° C. for about 20 minutes. (Alternatively an atmosphere of $CO_2$ could be used or mixtures of $CO_2$ and $H_2O$ and other gases such as $SO_2$.)

Then the beads were fed through a gas-air flame adjusted to burn approximately stoichiometrically to create a temperature of approximately 1150° C.–1200° C. Since the particles are so very small, it is believed that they substantially reach the temperature of the flame, at least within 50° C. thereof, as they fall through the heating zone provided by the flame. At that temperature, the viscosity of the glass of the beads was less than $10^4$ poises and about $10^3$ poises. The rate at which beads were fed through the flame was approximately 10 pounds per hour and the product was cooled or "quenched" and collected in a container by spraying water on it as it emerged from the flame. The composition of the glass employed in this example is plastic with slight flowability at approximately 1150° C. (For initial glass formation, however, a temperature of approximately 1400° C. was needed to convert raw material into glass having the analysis noted in this example.)

Approximately 70% of the product emerging from the flame treatment specified floated on water and consisted of small smooth-surfaced unicellular hollow glass bubbles. These bubbles were twice again fed through the flame under the same temperature conditions and collected in each case by a fine water spray. The fine water spray for collection is desirable inasmuch as the water spray aids in preventing the light weight bubbles from becoming entrained with flue gases and carried away. The resultant bubble product floated on water and had a size distribution of 67, 42, and 24 microns, meaning that only 5 weight percent of the bubbles had a diameter in excess of 67 microns (up to about 100 microns), 50 weight percent had a diameter of 42 microns or more, 95 weight percent had a diameter of 24 microns or more, and 5 weight percent were smaller than 24 microns down to about 5 microns in diameter. (The size distribution "short-hand" here described will be used hereinafter.) Stated another way, 90 weight percent of the bubbles fell within the range of 24 to 67 microns diameter, with 5% being larger and 5% smaller. Mass spectograph analysis showed that the bubbles contained within their internal voids about 75% $H_2O$, 15% $CO_2$, 9% air (80% nitrogen and 20% oxygen mixture) and 1% $SO_2$.

These bubbles had an average true particle density of 0.42. They were placed in mineral oil and the oil subjected to 12,000 p.s.i. Only 28% of the bubbles were crushed by this treatment, indicating a surprisingly high resistance to crushing. Their average wall thickness was about 1.8 microns, varying from about 1.2 to 2.2 microns.

Example 2

Beads of similar composition to those used as the starting material in Example 1 were screened to —325 mesh. These beads were fed to the flame as described in Example 1 at the rate of 10 lbs./hr. Approximately 34% of the product emerging from the flame floated on water and had an average true particle density of 0.47 gms./cc. The product which did not float on water was dried just sufficiently to remove surface water, and fed again to the flame, as aforespecified. Approximately 30% of the product from this re-run floated on water, had an average true particle density of 0.53, and a size distribution of 74, 49, and 21.

The re-run product of this example was separated into two fractions by liquid methane flotation. Approximately 12% by weight floated on methane; and that fraction is hereinafter referred to as Sample A. Sample A had an average true particle density of 0.38 and a size distribution of 99, 60, and 36. Sample B (84%), which sank in liquid methane, had an average true particle density of 0.57 and a size distribution of 83, 52, and 24. (4% by weight of the re-run product was lost in the flotation process.) Sample B was further fractionated by liquid ethylene flotation. Sample B-1 (72%), which floated on liquid ethylene, had an average true particle density of 0.52 and a size distribution of 80, 52 and 31. Sample B-2 (28%), which sank in liquid ethylene, had an average true particle density of 0.715 and a size distribution of 76, 49 and 26.

The Sample A product of this example was placed in oil and subjected to isostatic pressure of 12,000 p.s.i. Only approximately 42% of the total weight of the product was crushed by this treatment. As a comparison commercially available glass bubbles believed to have been formed by simultaneous fusion and blowing as taught in Veatch et al. U.S. Patent No. 3,030,215 were separated and graded to prepare a batch having substantially the same average true particle density and size distribution and total weight as Sample A. These commercially available bubbles were then subjected to the same isostatic pressure test. Approximately 96% by weight of the commercially available bubbles were crushed in the test.

Sample B-1 product when subjected to the same test was even more resistant to crushing. Only about 8.5 weight percent of Sample B-1 was crushed in the 12,000 p.s.i. isostatic pressure test in oil.

We have repeated the procedures used in this example many times obtaining samples of bubble product varying in average true particle density from about 0.25 up to 1.0 or slightly higher, and varying widely in size distribution but within the range of a few microns up to about 200 microns.

Example 3

Crushed glass of the same composition as the beads listed in Example 1 was air classified to give a product having a size distribution of 49, 29, 19. This material was fed to the flame, as specified in Example 1, at the rate of 20 lbs./hr. Approximately 28% of the emerging product floated on water, had an average true particle density of 0.487, and a size distribution of 65, 43, 26.

The bubbles were placed in oil and subjected to isostatic pressure of 12,000 p.s.i. Only 28% of the total weight of bubbles were crushed by this process.

Example 4

A glass cullet was selected having the following chemical composition by weight: 72.9% $SiO_2$, 1.8% $R_2O_3$ ($Al_2O_3+Fe_2O_3$), 10.5% CaO, 14.1% $Na_2O$ (including some $K_2O$), 0.35% BaO, 0.25% $SO_3$, 0.1% $F_2$. This cullet had a size distribution of 44, 25 and 7 microns. It was subjected to a $CO_2$ atmosphere for 20 minutes at 550° C., and then fed through a flame former, having a maximum temperature of 1200° C., at a rate of approximately 2 pounds per hour. A water spray was used, as in Example 1, to effect collection. 50 percent by weight of the material fed was formed into unicellular small glass bubbles which floated on water. The average true particle density of this water-floated portion was 0.53. Its size distribution was 64, 39 and 19 microns. Analysis of the contents of the hollow space of the spheres showed 96% $CO_2$, 2.8% $N_2$, 0.6% $O_2$, and 0.6% $H_2O$. There was no detectable bubble crushing after subjection to isostatic pressures of 10,000 p.s.i. in mineral oil.

Example 5

Glass bubbles were formed from glass cullet analyzed to contain 0.2% sulfur in the form of $SO_2$ and $SO_4$ (as gas forming material) and composed of the following composition: 69.1% $SiO_2$, 13.5% $Na_2O$, 0.2% $K_2O$, 3.2% MgO, 8.4% CaO, 1.2% $Al_2O_3$, 4.3% $P_2O_5$, and 0.1% $Fe_2O_3$. The cullet was dropped through a flame at 1150° C.–1200° C. Resulting bubble product floating on water had an average true particle density of .565, a size distribution of 67, 40, and 18, and was crushed to the extent of only 12.6% in the 12,000 p.s.i. mineral oil test.

We consider it particularly surprising that we are able to reheat glass particles to a temperature below that required for initial glass formation and yet effect bubble formation at the lower reheat temperatures. Such appears to be contrary to all common sense, especially in view of the fact that bubble formation would appear to depend upon the generation of internal gaseous matter at the reheat temperatures.

Comparison of glass bubbles formed by our technique with those of the same average true particle density, size range and inorganic analysis formed by simultaneous fusion-blowing has repeatedly indicated that the higher isostatic crushing resistance is exhibited by bubbles of our manufacture.

The glass composition for our glass bubble products is essentially the same as the composition of the glass converted to the bubble state by reheating as described herein. In accordance with conventional practice, we have chosen to illustrate glass compositions by designating the ingredients as chemical complexes or compounds, although the exact form taken by the ingredients in the amorphous state known as glass is not definitely known.

That which is claimed is:

1. Glass bubbles having a diameter between 5 and 300 microns, an average true particle density between 0.05 and 1.2, and a composition including at least 40 weight percent $SiO_2$ with a least 5 weight percent alkali metal oxide, and at least 5 weight percent up to approximately 50 weight percent of at least one other constituent selected from those conventionally present as optional ingredients in glasses requiring an initial glass forming temperature of melting between about 1200° C. and 1500° C., said bubbles being expanded particles of solid glass converted to said bubble state by reheating the solid glass.

2. Glass bubbles having a diameter between 5 and 300 microns, an average true particle density between 0.05 and 1.2, and a composition including at least 40 weight percent $SiO_2$ with at least 5 weight percent alkali metal oxide, the weight percent of $SiO_2$ being at least 5 times the weight percent of alkali metal oxide, and at least 5 weight percent up to approximately 50 weight percent of at least one other constituent selected from those conventionally present as optional ingredients in glasses requiring an initial glass forming temperature of melting between about 1200° C. and 1500° C., said bubbles being expanded particles of solid glass converted to said bubble state by reheating the solid glass to temperatures at which it becomes plastic with a viscosity between 10 and $10^4$ poises, said reheating temperature being between 100 and 300° C. lower than the temperature required for initial glassforming; said bubbles being further characterized by having a higher resistance to crushing under isostatic pressure conditions than glass bubbles of equal average true particle density and size distribution formed by converting non-glass raw material into glass simultaneously with bubble formation.

3. Smooth-surfaced glass bubbles having a diameter between 5 and 300 microns, an average true particle density between 0.05 and 1.2, and walls essentially free of any pores, said bubbles further having a weight percent compositional analysis for the glass thereof satisfying the following:

| | |
|---|---|
| $SiO_2$ | 60–80 |
| $Na_2O$ | 5–16 |
| CaO | 5–25 |
| $K_2O+Li_2O$ | 0–10 |
| $Na_2O+K_2O+Li_2O$ | 5–16 |
| RO (other than CaO) | 0–15 |
| $RO_2$ (other than $SiO_2$) | 0–10 |
| $R_2O_3$ | 0–20 |
| $R_2O_5$ | 0–25 |
| Fluorine | 0–5 | where RO refers to bivalent metal oxides other than CaO, $RO_2$ refers to quadrivalent metal oxides other than $SiO_2$, $R_2O_3$ refers to trivalent metal oxides, and $R_2O_5$ refers to pentavalent metal oxides, the compositional analysis of the glass being such that its initial glassforming temperature of melting is between about 1200° C. and 1500° C., said bubbles being expanded particles of solid glass converted to said bubble state by reheating the solid glass to a temperature between 100° C. and 300° C. lower than the temperature required for initial glassforming.

References Cited

UNITED STATES PATENTS

| | | | |
|---|---|---|---|
| 2,794,301 | 6/1957 | Law et al. | 65—21 |
| 2,883,347 | 4/1959 | Fisher et al. | 106—40 |
| 3,030,215 | 4/1962 | Veatch et al. | 106—40 |
| 3,061,495 | 10/1962 | Alford | 65—21 |

HELEN M. McCARTHY, *Primary Examiner.*